United States Patent [19]

Kuriyama et al.

[11] Patent Number: 5,002,455
[45] Date of Patent: * Mar. 26, 1991

[54] FLOW PROCESSING SYSTEM

[75] Inventors: Kazumi Kuriyama; Yutaka Takasu; Shigeru Kono; Chiharu Koshio; Kazuhiko Nagata, all of Yamanashi, Japan

[73] Assignee: Pioneer Electronic Corporation, Tokyo, Japan

[*] Notice: The portion of the term of this patent subsequent to Jul. 25, 2006 has been disclaimed.

[21] Appl. No.: 416,001

[22] Filed: Oct. 2, 1989

Related U.S. Application Data

[63] Continuation of Ser. No. 323,834, Mar. 15, 1989, abandoned, which is a continuation of Ser. No. 94,994, Sep. 10, 1987, Pat. No. 4,850,791.

[30] Foreign Application Priority Data

Sep. 10, 1986 [JP] Japan .................. 61-213342
Sep. 10, 1986 [JP] Japan .................. 61-213343

[51] Int. Cl.$^5$ ............................. B65G 49/00
[52] U.S. Cl. .................. 414/750; 15/309.2; 34/236; 98/36; 414/222
[58] Field of Search .......... 414/222, 223, 750; 198/375, 377; 15/301, 306 B; 34/236; 98/36; 55/DIG. 29

[56] References Cited

U.S. PATENT DOCUMENTS

| | | | |
|---|---|---|---|
| 3,880,061 | 4/1975 | Hensiek et al. | 55/DIG. 29 |
| 4,482,043 | 11/1984 | Bauman et al. | 414/750 X |
| 4,619,360 | 10/1986 | Taniguchi et al. | 198/377 X |
| 4,722,298 | 2/1988 | Rubin et al. | 414/222 X |

Primary Examiner—Robert J. Spar
Assistant Examiner—Donald W. Underwood
Attorney, Agent, or Firm—Fleit, Jacobson, Cohn, Price, Holman & Stern

[57] ABSTRACT

A flow processing system for processing disc-shaped articles such as discs to be used to produce video or audio disc masters, whereby a plurality of processing units for performing respectively different processing operations are combined into a single system in which each disc is moved only horizontally and in a continuously rotating condition, both during processing and while being moved between the processing units. In addition, the supporting structure of the processing units is implemented such as to produce no disturbances in a horizontally directed dust-excluding flow of air, to ensure maximum prevention of adherence of dust particles to the disc surfaces.

3 Claims, 7 Drawing Sheets

Fig. 6

| POSITION SENSOR | FRONT END | APPARATUS UNIT 1 | INTER-MEDIATE POSITION | APPARATUS UNIT 2 | INTER-MEDIATE POSITION | APPARATUS UNIT 3 | REAR END |
|---|---|---|---|---|---|---|---|
| 36 a | ON | ON | OFF | OFF | OFF | OFF | OFF |
| 36 b | OFF | ON | ON | OFF | OFF | OFF | OFF |
| 36 c | OFF | OFF | ON | ON | OFF | OFF | OFF |
| 36 d | OFF | OFF | OFF | ON | ON | OFF | OFF |
| 36 e | OFF | OFF | OFF | OFF | ON | ON | OFF |
| 36 f | OFF | OFF | OFF | OFF | OFF | ON | ON |

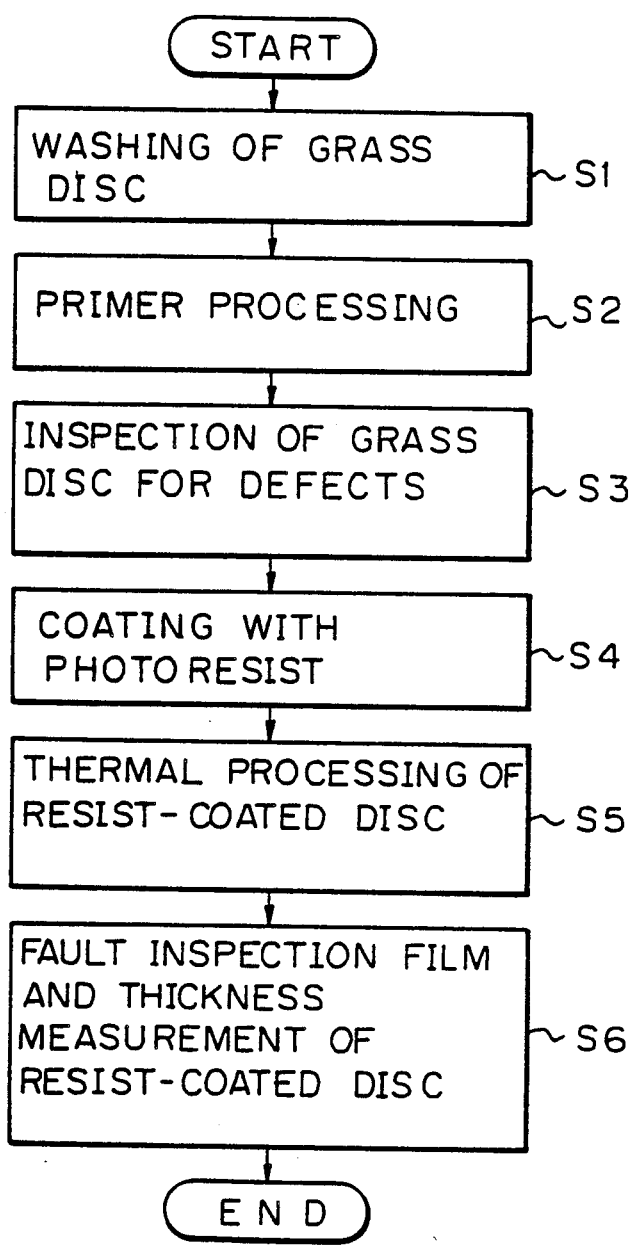

FLOW PROCESSING SYSTEM

This application is a continuation of application Ser. No. 07/323,834, filed Mar. 15, 1988 which is a continuation of application Ser. No. 07/094,994 filed Sept. 10, 1987, now U.S. Pat. No. 4,850,791.

BACKGROUND OF THE INVENTION

The present invention relates to an apparatus for performing predetermined processing within a clean room of disc-shaped articles, such as discs to be used for video or audio recording.

Optical recording is widely utilized for recording video, audio and other data, with the recording medium being in the form of discs. In the optical recording method, a photoresist is coated on a glass disc which serves as a substrate, to thereby produce a disc which can be utilized to produce a disc master. Light from a laser beam, focussed to a minute spot, is caused to fall upon the resist film thus formed on the glass disc, in accordance with video or audio data, etc. This process is referred to as the bit-by-bit method of light exposure. The disc is subsequently developed to produce a disc master, in which surface pits are formed whose lengths and repetition period constitute the recorded data.

For convenience of description, a glass disc as described above which is in the condition prior to having a film of photoresist formed thereon will be referred to in the following simply as a glass disc, while a disc which has a film of photoresist formed thereon will be referred to as a resist-coated disc.

With such a method, it is necessary to execute several processing steps in order to prepare a resist-coated disc, i.e. washing of the glass disc, coating the disc with primer (in order to enhance the degree of adherence of the photoresist to the disc surface), photoresist coating, and baking (i.e. thermal processing). During these processing steps, it is essential that all dust be excluded, and for this reason the processing is performed entirely within a clean room. Furthermore, even within the interior of a clean room, minute particles of dust which have not been removed by the filters will remain floating in the atmosphere. In order to prevent these minute dust particles from adhering to the disc surface, a current of air is blown across the glass disc and the resist-coated disc while processing is being carried out on the discs. However it has been found in practice that a sufficiently high degree of dust exclusion effectiveness cannot be attained by such a flow of air alone, due to disturbances which arise within the air flow.

Moreover in the prior art, each of the processing steps described above is executed by a separate processing unit, with the discs generally being manually transferred between these processing units following each processing step. As a result, the overall system size is large, and the rate of productivity is low.

SUMMARY OF THE INVENTION

It is an objective of the present invention to overcome the problems of the prior art described above, by providing a flow processing system for disc-shaped articles whereby an effective air flow is continuously maintained, to thereby maintain a sufficiently high degree of dust exclusion effectiveness of the air current.

It is a further objective of the present invention to provide a flow processing system for disc-shaped articles which is compact in size and enables enhanced productivity to be attained.

To attain the above objectives, a flow processing system according to the present invention including a plurality of processing units for executing respectively different processing operations on disc-shaped articles which are rotated by a turntable, the plurality of processing units being supported by a single frame, comprises a turntable unit including the turntable and a drive source for rotating the turntable, guidance means mounted on the frame for guiding the turntable unit between the plurality of processing units, and drive means for moving the turntable unit between the plurality of processing units, and is characterized in that rotational drive applied to the turntable is continued while the turntable is being moved between the processing units.

A flow processing system according to the present invention is further characterized in that the processing units are supported upon the frame by supporting means which do not produce any disturbances in a flow of air which is directed substantially horizontally towards the disc-shaped articles during processing.

BRIEF DESCRIPTION OF THE DRAWINGS

FIG. 6 is a table setting out relationships between outputs produced from an array of position sensors and corresponding positions of a turntable;

FIG. 7 is a flow chart of an operating sequence for preparing resist-coated discs.

DESCRIPTION OF THE PREFERRED EMBODIMENTS

Figure 1:
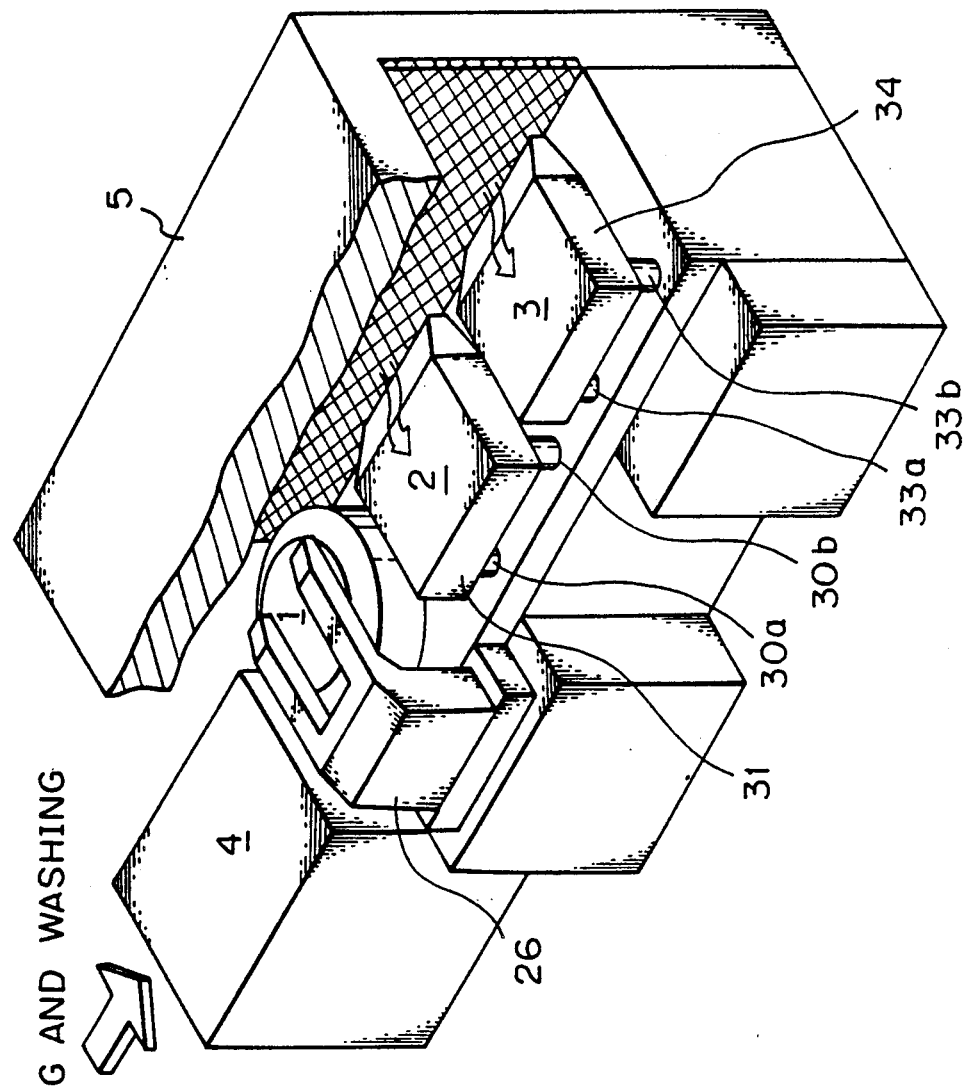
FIG. 1 is an oblique view of a flow processing system according to the present invention, for coating glass discs with photoresist.

An embodiment of the present invention will be described in the following, referring to the drawings. FIG. 1 is an oblique view of the embodiment, which is a flow processing system for preparing discs to be used as disc masters, by forming a film of photoresist upon the glass discs. Numeral 1 denotes an apparatus unit which functions as a "wet stage", for executing processing steps consisting of washing the glass discs, primer processing, and photoresist coating. The system further includes an apparatus unit 2 which constitutes an inspection stage whereby the glass discs are inspected for defects, the resist-coated discs are inspected for defects, and the film thickness on the resist-coated discs is measured. Numeral 3 denotes an apparatus unit functioning as a baking stage, for executing pre-bake processing. The flow processing system which is thus configured of the apparatus units 1 to 3 is contained within a clean room. With this flow processing system the operations of washing and primer processing the glass discs, inspecting the glass discs, coating the discs with photoresist, thermal processing, inspection of the resist-coated discs for faults, and inspection of the film thickness of the resist-coated discs, are executed automatically as a continuous process flow.

The machined and washed glass discs (not shown in the drawings) are temporarily stored in a wet stock chamber 4, in which ultrasonic washing etc. is executed to maintain the discs in optimum condition. Next, each disc is automatically transported, in a substantially horizontal orientation, to the apparatus unit 1, in which the processing sequence described above is executed with the disc being maintained in a horizontal position throughout. On completion of this processing sequence, the disc is transported out of the apparatus unit 3. A clean bench 5 is disposed at the left side of the apparatus, with respect to the direction of processing flow from the apparatus unit 1 to the apparatus unit 3. A flow of air is sent from the clean bench 5 in a substantially horizontal direction towards the glass disc which is undergoing the processing sequence described above. As a result, minute particles of dust etc. which have not been removed by filtering and are floating in the atmosphere, are prevented from adhering to the surface of the glass disc. The operator of the apparatus is positioned downstream from the apparatus units 1 to 3 in the air current from the clean bench 5.

The specific configuration of the apparatus units 1 to 3 will be described referring to FIGS. 2 to 4.

A glass disc 6 is supported in a substantially horizontal orientation by a turntable 7. The turntable 7, a motor 8 serving as a drive source, and a belt 9 which transfers rotational force from the motor 8 to the turntable 7 constitute a turntable unit 10. The turntable unit 10 is mounted upon a pair of guide rails 12a and 12b which are disposed mutually parallel and run between the apparatus units 1 to 3 and are mounted on an upper face of a frame 11. The turntable unit 10 is movable between the apparatus units 1 to 3 by means of a rear bearing (not shown in the drawings). A threaded shaft 13 is rotatably mounted on the upper face of the frame 11, aligned parallel to the guide rails 12a and 12b and extending substantially along the range of movement of the turntable unit 10. The threaded shaft 13 is engaged in a nut 14 which is attached to the turntable unit 10. The threaded shaft 13 is rotated by being driven by a transport motor 15, whereby the turntable unit 10 is moved along a direction which is determined by the direction of rotation of the shaft 13.

Figure 4:
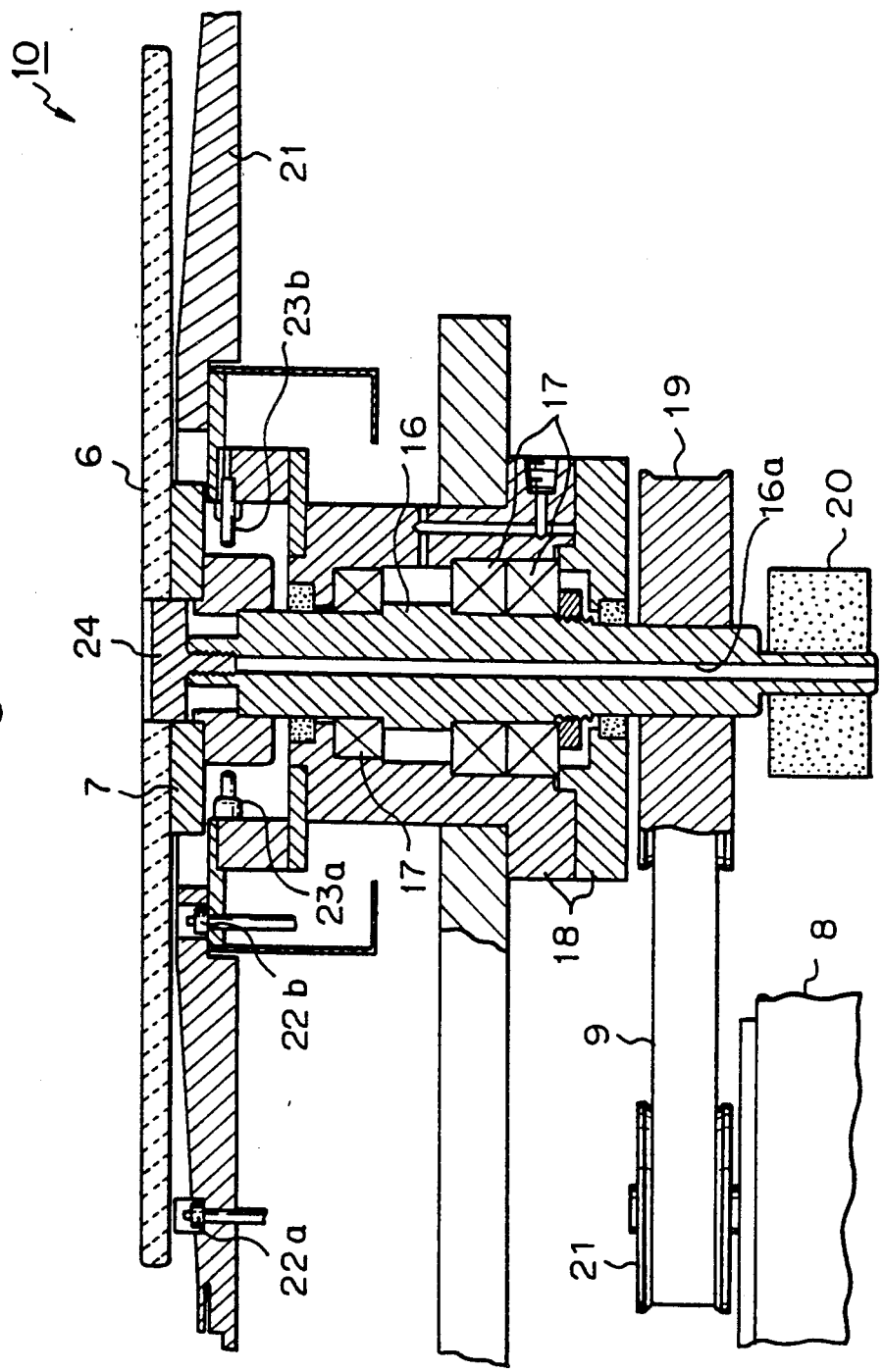
FIG. 4 is a cross-sectional view of a specific configuration for a turntable unit shown in FIGS. 2 and 3.

As shown in FIG. 4, the turntable 7 is attached to a top portion of a spindle 16 having a central bore 16a formed therein. The spindle 16 is aligned with a central axis of the turntable 7, and is rotatably mounted with respect to a housing 18 by a bearing 17, with a large pulley 19 being fixedly attached to the lower end of the spindle 16. The large pulley 19 and a small pulley 21, which is fixedly mounted on the drive shaft of a motor 8, are linked by a belt 9 for driving the large pulley 9 by the motor 8. Due to the use of this belt drive configuration, a vacuum seal 20 which is attached to the lower end of the spindle 16 can be easily replaced. More specifically, if a direct drive configuration were to be used, it would be necessary to remove heavy components such as the motor 8 each time that the vacuum seal 20 has to be replaced, which would be extremely troublesome. However by using a drive belt arrangement this problem is avoided, and changing of the vacuum seal 20 can be easily carried out.

A receiving stage 21 is fixedly mounted around the periphery of the turntable 7, with the diameter of the receiving stage 21 being larger than the largest diameter of the glass disc 6. A pair of size sensors 22a, 22b are mounted on the receiving stage 21, positioned along a radius of the glass disc 6. The size sensors 22a, 22b serve to detect the size of the glass disc 6. A pair of type sensors 23a, 23b are mounted in the vicinity of the central aperture of the receiving stage 21, for detecting the type of the glass disc 6. A center cap 24 is mounted to cover the upper end of the spindle 16.

Figure 2:
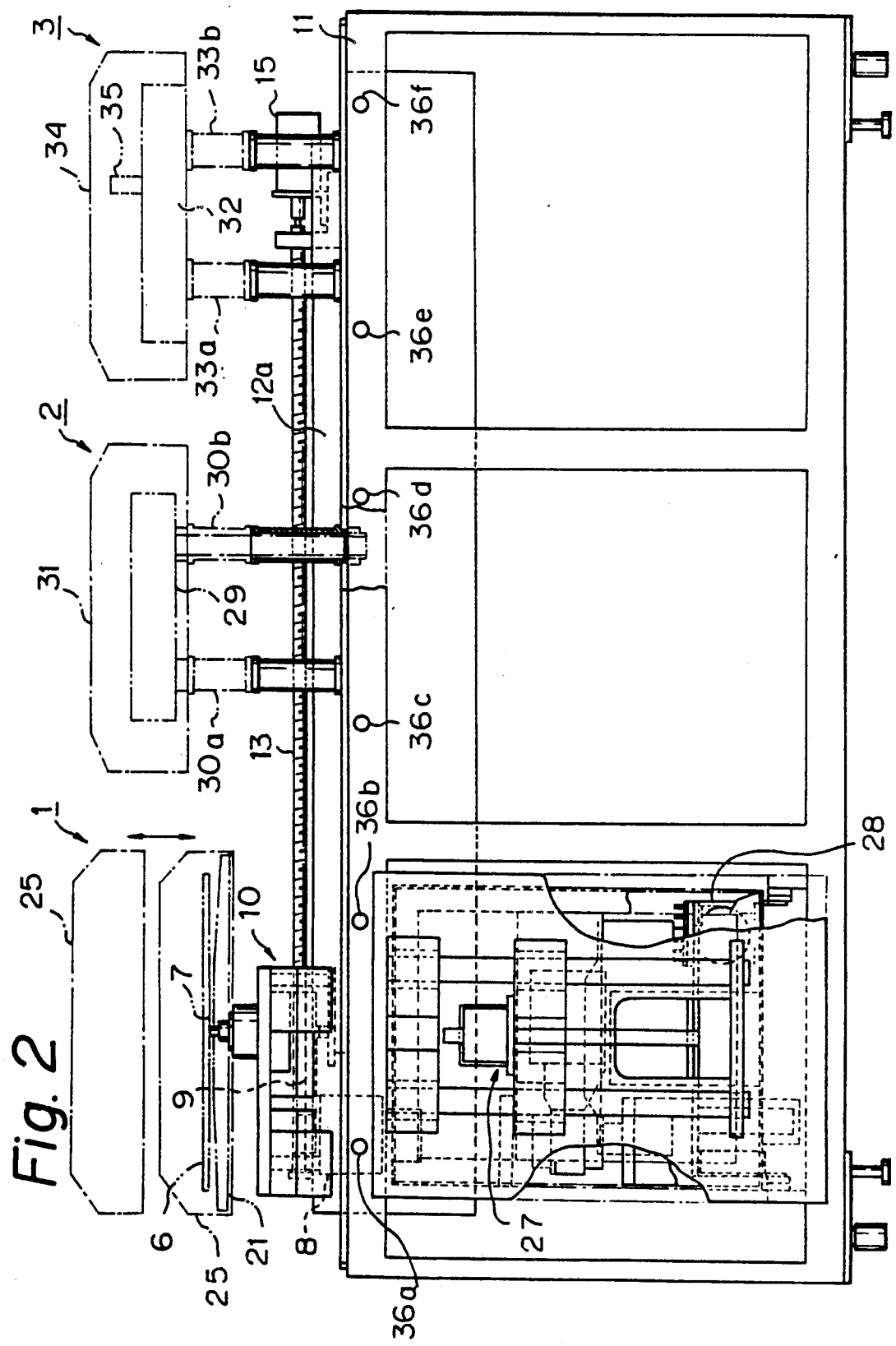
FIGS. 2 and 3 are respectively a partial cross-sectional view in elevation and a partial cross-sectional view in plan of a specific configuration for the apparatus of FIG. 1.
Figure 3:
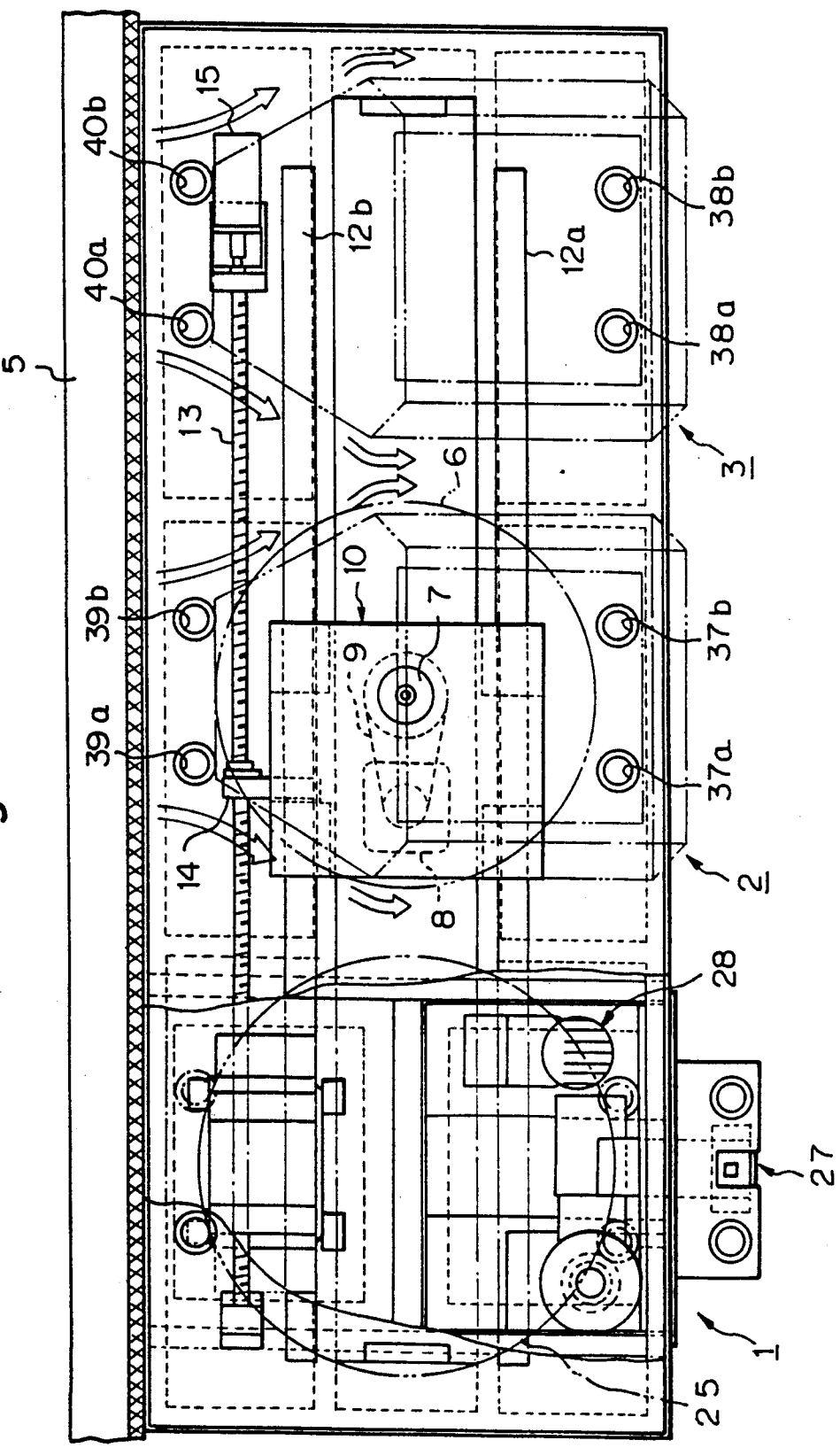

As shown in FIGS. 2 and 3, a cap 25 is incorporated, which can be moved upward and downward with respect to the frame of the apparatus unit 1. The cap 25 is normally maintained in an upper position, such as not to obstruct movement of the turntable unit 10. When processing is to be executed by the apparatus unit 1, the cap 25 is driven to a lowered position by a linear drive motor 27, acting through a linking member 26 (shown in FIG. 1). It should be noted that the present invention is not limited to the use of the linear motor 27 as a drive source for the cap 25, and that various other drive means could be utilized for this purpose, so long as these are capable of driving the cap 25 to upper and lower positions. When the cap 25 is in the lower position, it fits tightly around the periphery of the receiving stage 21, to establish a tightly sealed condition. In this condition, the glass disc 6 is held in contact with the turntable 7 by vacuum suction produced by the action of a vacuum pump 28, while being rotated by motor 8 and subjected to washing by a washing fluid which is ejected from a nozzle (not shown in the drawings) which is mounted within the cap 25. Upon completion of this washing process, primer processing is performed. On completion of the washing and primer processing, the turntable unit 10 carrying the glass disc 6 is moved along the guide rails 12a and 12b to the apparatus unit 2.

The apparatus unit 2 consists of an inspection unit 29, and two pillars 30a and 30b for supporting the inspection unit 29, together with a hood 31 covering the inspection unit 29. The two pillars 30a and 30b also function as ducts (e.g. wiring ducts for accommodating electrical cables, etc.) and are positioned downstream in the air flow from the glass disc 6, i.e. are positioned on the opposite side of the apparatus from the clean bench 5. As a result of this arrangement, no disturbances due to the supporting means for the inspection unit 29 are produced in the flow of air which is sent in a direction parallel to the glass disc 6 from the clean bench 5, to thereby maintain the effectiveness of this air flow in preventing adherence of dust particles to the surface of the glass disc 6. The glass disc 6 which has been subjected to washing and primer processing is inspected for scratches or other defects by the inspection unit 29 of the apparatus unit 2. In addition, after a disc has been subjected to thermal processing in the apparatus unit 3, the resultant resist-coated disc is inspected by the inspection unit 29 of apparatus unit 2 for scratches or other surface defects, and at the same time the thickness of the film of photoresist which has been formed on the disc surface is measured.

The apparatus unit 3 incorporates a processing unit consisting of a baking unit 32 which is supported on the frame 11 by a pair of pillars 33a and 33b and is covered by a hood 34. As in the case of the apparatus unit 2, the pillars 33a and 33b also function as ducts and are positioned downstream from the disc being processed, with respect to the air flow which is sent from the clean bench 5 as described above. Pre-bake processing is performed on the resist-coated disc which has been previously coated with photoresist. This pre-bake processing is executed by applying radiation which is in the far infra-red range. During the pre-bake processing, the surface temperature of the resist-coated disc is measured by a radiation thermometer 35, with the surface temperature being controlled on the basis of the measured temperature.

As will be clear from FIG. 1, the hoods 31 and 34 shown in FIGS. 2 and 3 are respectively positioned close to the clean bench 5, with a portion of the top face of each hood (adjacent to the side of the hood which is closest to the clean bench 5) being shaped to slope downwards, and with portions of two opposing side faces of each hood (i.e. portions which are adjacent to the aforementioned side of the hood) being shaped to slope towards a central position between these opposing side faces. As a result, as indicated by the arrows in FIGS. 1 and 3, the air flow which is sent from the clean bench 5 is caused to flow in a satisfactory manner, in the region of that air flow which is downstream from the aforementioned sloping portions of the upper and side faces of each of hoods 31 and 34. In this way a satisfactory air flow, free from disturbances, is maintained around the glass discs and the resist-coated discs, both during processing and inspection and during movement of the discs between the processing units.

Figure 5:
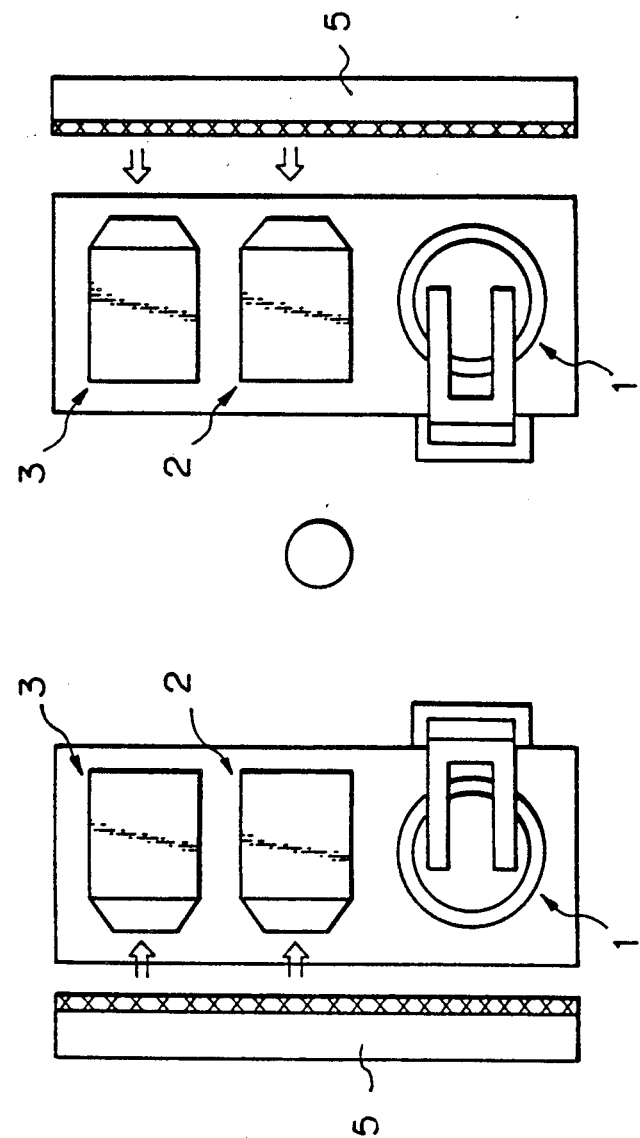
FIG. 5 is a plan view to illustrate an arrangement whereby two systems according to the present invention are positioned at the right and left sides of an operator.

As described in the above, the inspection unit 29, the hood 31, the baking unit 32, and the hood 34 are respectively supported on pillars 30a, 30b, and 33a, 33b respectively, and are positioned downstream with respect to the glass disc 6 in the air flow. As shown in FIG. 3, the pillars 30a and 30b and the pillars 33a and 33b are respectively retained in retaining apertures 37a, 37b and 38a, 38b which are formed in the upper face of the frame 11. If a pair of systems according to the present invention are to be used together, disposed respectively at the right and left sides of an operator, then it will in general be necessary to position the clean bench 5 of one system on the opposite side of the frame 11 from that shown in FIG. 1. If that were to be done, using the arrangement shown in FIG. 1, then the pillars 30a and 30b and 33a and 33b of one system will be positioned upstream in the air flow from the clean bench 5 of that system, with respect to a disc being processed. Furthermore the sloping faces of the hoods 31 and 34 of one system would be positioned downstream from the air flow, thereby preventing a smooth flow. As a countermeasure against this, the pillars 30a and 30b and the pillars 33a and 33b are supported such as to be freely removable from the retaining apertures 37a, 37b and 38a, 38b respectively, and to be capable of being inserted into an oppositely positioned set of retaining apertures 39a, 39b and 40a, 40b respectively. In this way the most suitable positions for the pillars 30a and 30b and the pillars 33a and 33b can be selected as required, so that as shown in FIG. 5 the pillars 30a and 30b and the pillars 33a and 33b can be always positioned downstream with respect to the glass disc 6, and the sloping faces of the hoods 31 and 34 can be positioned upstream in the air flow.

As shown in FIG. 2, a set of six position sensors 36a to 36f are arrayed along the direction of movement of the turntable unit 10, mounted on the frame 11, for sensing the position of the turntable unit 10 along the direction of movement thereof. Two of these position sensors 36a to 36f are provided for each of the apparatus units 1 to 3, and the position of the turntable unit 10 is detected based upon a combination of outputs produced from these position sensors 36a to 36f. More specifically, as shown in FIG. 6, a condition in which only the position sensors 36a and 36b are in the ON state indicates that the turntable unit 10 is positioned at the apparatus unit 1, a condition in which only the position sensors 36c and 36d are in the ON state indicates that the turntable unit 10 is positioned at the apparatus unit 2, and a condition in which only the position sensors 36e and 36f are in the ON state indicates that the turntable unit 10 is positioned at the apparatus unit 3. When the turntable unit 10 is positioned at one end of its range of travel, this is indicated by only one of the position sensors 36a or 36f being in the ON state. When the turntable unit 10 is in an intermediate position between apparatus units, then this is indicated by a condition in which only the position sensors 36b and 36c or only the position sensors 36d and 36e are in the ON state.

By detecting the position of the turntable unit 10 in this way, on the basis of combinations of outputs produced from the position sensors 36a to 36f, the turntable unit 10 can be accurately and reliably halted at the appropriate working positions of the apparatus. Furthermore if for example a power supply failure should occur while the turntable unit 10 is in the process of being moved, then immediately following the restoration of power, the appropriate direction in which the turntable unit 10 is to be moved can be immediately determined on the basis of the outputs from the position sensors, so that rapid restoration of operation can be smoothly executed after a power failure has occurred.

With the system configuration described above, control of movement of the turntable unit 10, determination of the positions at which the turntable unit 10 is to be halted, control of the processing operations executed by each of the apparatus units 1 to 3, and control of the turntable 7, can be performed automatically, for example by means of a system controller (not shown in the drawings) based on a microcomputer.

The operating sequence which is executed by this embodiment of the present invention will be described referring to the flow chart of FIG. 7.

Firstly, when a glass disc has been placed on the turntable 7 at the start of processing by the apparatus unit 1, the cap 25 is moved downward to engage with the receiving stage 21 of the turntable unit 10 to thereby establish a tightly sealed condition. Cleansing of the glass disc is then carried out in this condition (step S1). Primer processing is then carried out (step S2). With the glass disc which has been subjected to washing and primer processing still mounted on the turntable 7, the turntable unit 10 is then moved to the apparatus unit 2, and the glass disc is inspected for defects (step S3). If the disc passes this inspection, it is then moved back to the apparatus unit 1, and photoresist processing is carried out (step S4), to convert the disc to a resist-coated disc. This resist-coated disc is then moved on the turntable unit 10 past the apparatus unit 2 to the apparatus unit 3, and is subjected to pre-bake processing by far infrared radiation (step S5). Upon completion of this thermal processing, the resist-coated disc is again moved to the apparatus unit 2 to be inspected for defects and for measurement of the thickness of the photoresist film (step S6). This completes the processing sequence for preparing a resist-coated disc.

Each of the above processing steps which are performed by the apparatus units 1 to 3 is of course carried out while the turntable 7 is being rotated. Furthermore with the system of the present invention, this rotation of the turntable 7 is also continued while the turntable 7 is being moved between the apparatus units 1 to 3. In this way the glass disc or resist-coated disc is continuously rotated at all times, thereby serving to further prevent the adherence of particles of dust etc. on the disc surface. Furthermore since it is not necessary for time to be taken to move the turntable 7 upward each time it is moved to one of the apparatus units 1 to 3, movement between the various processing steps can be smoothly executed.

In the embodiment described above, the present invention is applied to an apparatus for preparing resist-coated discs, by processing glass discs. However it should be noted that the present invention is not limited to such an application, and can be applied to various types of apparatus for executing specific processing operations on thin flat articles. Furthermore with the embodiment described above, a plurality of processing units are combined into a single system. However the present invention is of course applicable to an apparatus which is inherently configured as a single unit.

It can be understood from the above description that with a flow processing system for processing a disc-shaped article according to the present invention, as described hereinabove, pillars which support a processing unit with respect to a frame of the apparatus at a position above a disc-shaped article, are disposed downstream in an air flow with respect to the article, whereby a satisfactory flow of air can be maintained so that a satisfactory dust exclusion effect can be produced by the air flow.

What is claimed is:

1. A flow processing system for use in a clean room in which air-flow is circulated through filters for the removal of dust particles, which comprises:

a plurality of processing units for respectively executing different processing operations on a disc-shaped article, said processing units being sequentially arranged along a generally horizontal line;

a turntable for carrying on a support surface thereof said disc-shaped article to be processed;

guidance means for rotatably carrying said turntable and for transporting said turntable from one processing unit to another along said line;

drive means for continuously rotating said turntable both while said turntable is positioned at one of said processing units and also while said turntable moves from one of said processing units to another, to prevent minute dust particles in the atmosphere which have not been removed by the filters from adhering to said disc-shaped article while processing is being carried out on said disc-shaped article; and air-flow generating means located along one side of said line of processing units, for generating an additional air-flow in the clean room directed over and essentially parallel to the support surface of said continuously rotating turntable and the disc-shaped article thereon transversely of said line of processing units and so as to encompass an area covering all of said processing units, as well as spaces between said processing units, thereby providing a disturbance free continuous air-flow across and between the processing units so as to encompass the entire distance traveled by the turntable during processing of said disc-shaped article and further prevent the minute dust particles in the atmosphere which have not been removed by the filters from adhering to said disc-shaped article while processing is being carried out on said disc-shaped article.

2. A flow processing system according to claim 1, in which said processing units are arranged along a straight line.

3. A flow processing system according to claim 1, in which all of said processing units are accessible to an operator from an opposite side of said line of said processing units and downstream of said additional air-flow produced by said air-flow generating means.

* * * * *